US011308834B2

(12) United States Patent
Zhu

(10) Patent No.: US 11,308,834 B2
(45) Date of Patent: Apr. 19, 2022

(54) GOA DISPLAY PANEL

(71) Applicant: TCL China Star Optoelectronics Technology Co., Ltd., Guangdong (CN)

(72) Inventor: Jing Zhu, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 290 days.

(21) Appl. No.: 16/617,081

(22) PCT Filed: Sep. 23, 2019

(86) PCT No.: PCT/CN2019/107262
§ 371 (c)(1),
(2) Date: Nov. 26, 2019

(87) PCT Pub. No.: WO2021/031280
PCT Pub. Date: Feb. 25, 2021

(65) Prior Publication Data

US 2021/0366336 A1 Nov. 25, 2021

(30) Foreign Application Priority Data

Aug. 20, 2019 (CN) ......................... 201910767691.0

(51) Int. Cl.
*G02F 1/1343* (2006.01)
*G09G 3/20* (2006.01)

(52) U.S. Cl.
CPC ....... *G09G 3/20* (2013.01); *G09G 2300/0408* (2013.01); *G09G 2310/0294* (2013.01)

(58) Field of Classification Search
None
See application file for complete search history.

(56) References Cited

U.S. PATENT DOCUMENTS

| | | | | |
|---|---|---|---|---|
| 2015/0060682 | A1 | 3/2015 | Weisfield et al. | |
| 2015/0301415 | A1* | 10/2015 | Sawada | G02F 1/134336 349/147 |
| 2016/0005372 | A1* | 1/2016 | Yu | G09G 3/20 345/94 |
| 2017/0117341 | A1 | 4/2017 | Chen et al. | |

(Continued)

FOREIGN PATENT DOCUMENTS

| | | | |
|---|---|---|---|
| CN | 105139806 | A | 12/2015 |
| CN | 108492789 | A | 9/2018 |

(Continued)

*Primary Examiner* — Carl Adams
(74) *Attorney, Agent, or Firm* — Taft Stettinius & Hollister LLP

(57) ABSTRACT

A gate driver on array (GOA) display panel is provided, including a display area, a bezel area, a plurality of pixel units, and a GOA circuit. The plurality of pixel units are disposed in the display area in an array. The GOA circuit includes a GOA unit group and a trace group. The GOA unit group is disposed in the display area. The trace group is electrically connected to the GOA unit group and is disposed in the bezel area. The trace group includes a GOA bus and a common electrode line. A super narrow bezel design is achieved by arranging the cascaded GOA unit group of the GOA circuit within the display area.

15 Claims, 4 Drawing Sheets

(56) References Cited

U.S. PATENT DOCUMENTS

| | | | | |
|---|---|---|---|---|
| 2019/0189232 | A1* | 6/2019 | Wang | G09G 3/3674 |
| 2019/0285930 | A1 | 9/2019 | Chen et al. | |

FOREIGN PATENT DOCUMENTS

| | | | |
|---|---|---|---|
| CN | 109817177 | A | 5/2019 |
| CN | 110047450 | A | 7/2019 |
| CN | 110136663 | A | 8/2019 |

* cited by examiner

GOA DISPLAY PANEL

CROSS-REFERENCE TO RELATED APPLICATIONS

This application is a U.S. National Phase of International PCT Application No. PCT/CN2019/107262 filed Sep. 23, 2019, which claims the benefit of Chinese Patent Application Serial No. 201910767691.0 filed Aug. 20, 2019, the contents of each application are incorporated herein by reference in their entirety.

FIELD OF DISCLOSURE

The present disclosure relates to the field of display technologies, and in particular to a GOA display panel.

BACKGROUND

A gate driver on array (GOA) technology is a technique of directly fabricating gate driver ICs on an array substrate instead of a driver chip fabricated from an external silicon chip. The GOA circuit can be directly disposed on a periphery of a panel to reduce production processes, thereby facilitating a design of a narrow bezel on a side of the GOA circuit of a display screen, and also reducing a production cost, so that it is widely used and researched.

In response to consumer demand, large-size and high-resolution displays with a super narrow bezel (SNB) design have become a market trend. Moreover, assembled display screens are inevitable for a design of the narrow bezel. However, as a resolution becomes higher and a pixel size is reduced, a space between GOA layouts becomes larger. Therefore, how to implement a narrow bezel becomes a problem that must be solved.

Please refer to FIG. 1, which shows a schematic diagram of a GOA display panel 1 in the prior art. The GOA display panel 1 includes a display area 10 (i.e., an active area) and a bezel area 11. The display area 10 is used to set a pixel array. The bezel area 11 is used to set related circuits such as a driving circuit. A pair of GOA circuits 12 are respectively disposed on opposite sides of on a bezel area 11 of the GOA display panel 1. Referring to FIG. 2, a partial cross-sectional view of the GOA display panel 1 of FIG. 1 along an A-A line is shown. The bezel area 11 of GOA display panel 1 includes a GOA circuit 12, a lower substrate 13, an upper substrate 14, an insulating layer 15, and a sealant 16. The GOA circuit 12 includes N-stages GOA units 121, GOA bus 122, and a common electrode line 123. For large-size and high-resolution displays, a RC loading during signal transmission is large, so it is necessary to employ a design of a wider GOA bus 122, resulting in a larger width d1 of the bezel area 11. For example, in a case of existing products, the width d1 of the bezel area 11 is generally more than 5 mm, which cannot meet needs of consumers and lacks market competitiveness.

Accordingly, it is necessary to provide a GOA display panel to solve the problems in the prior art.

SUMMARY OF DISCLOSURE

In order to solve the above problems of the prior art, an object of the present disclosure is to provide a GOA display panel. By changing a circuit layout, a cascade GOA circuit group of a GOA circuit is changed from a bezel area to a display area of the display panel, so that the display panel has a very narrow bezel design on both sides.

In order to achieve the above object, the present disclosure provides a gate driver on array (GOA) display panel, including a display area, a bezel area, a plurality of pixel units, and a GOA circuit. The plurality of pixel units are disposed in the display area in an array. The GOA circuit includes a GOA unit group and a trace group. The GOA unit group includes a plurality of cascaded GOA units and is disposed in the display area. The GOA unit group is disposed along an extending direction of a long side of the GOA display panel. The trace group is electrically connected to the GOA unit group and is disposed in the bezel area. The trace group includes a GOA bus and a common electrode line, the trace group is disposed along an extending direction of a short side of the GOA display panel, and the long side is adjacent to the short side.

In one preferable embodiment of the present disclosure, each of the GOA units includes a pull-up control circuit, a pull-up circuit, a down transfer circuit, a pull-down circuit, a pull-down holding circuit, and a bootstrap capacitor.

In one preferable embodiment of the present disclosure, a width of the trace group is equal to a distance from a side of the trace group that is in contact with the display area to an edge of the short side of the GOA display panel.

In one preferable embodiment of the present disclosure, the width of the trace group is less than or equal to 1.2 micrometers.

In one preferable embodiment of the present disclosure, the GOA display panel includes two trace groups respectively disposed on opposite sides of the display area, and the two trace groups are respectively adjacent to edges of two short sides of the GOA display panel.

In one preferable embodiment of the present disclosure, the GOA display panel includes two GOA unit groups, and one of the two GOA unit groups is adjacent to an edge of the display area.

In one preferable embodiment of the present disclosure, another one of the two GOA unit groups is disposed between adjacent rows of the pixel units.

The present disclosure also provides a gate driver on array (GOA) display panel, including a display area, a bezel area, a plurality of pixel units, and a GOA circuit. The plurality of pixel units are disposed in the display area in an array. The GOA circuit includes a GOA unit group and a trace group. The GOA unit group is disposed in the display area. The trace group is electrically connected to the GOA unit group and is disposed in the bezel area. The trace group includes a GOA bus and a common electrode line.

In one preferable embodiment of the present disclosure, the GOA unit group is disposed along an extending direction of a long side of the GOA display panel.

In one preferable embodiment of the present disclosure, the trace group is disposed along an extending direction of a short side of the GOA display panel, and the long side is adjacent to the short side.

In one preferable embodiment of the present disclosure, the GOA unit group includes a plurality of cascaded GOA units.

In one preferable embodiment of the present disclosure, each of the GOA units includes a pull-up control circuit, a pull-up circuit, a down transfer circuit, a pull-down circuit, a pull-down holding circuit, and a bootstrap capacitor.

In one preferable embodiment of the present disclosure, a width of the trace group is equal to a distance from a side of the trace group that is in contact with the display area to an edge of the short side of the GOA display panel.

In one preferable embodiment of the present disclosure, the width of the trace group is less than or equal to 1.2 micrometers.

In one preferable embodiment of the present disclosure, the GOA display panel includes two trace groups respectively disposed on opposite sides of the display area, and the two trace groups are respectively adjacent to edges of two short sides of the GOA display panel.

In one preferable embodiment of the present disclosure, the GOA display panel includes two GOA unit groups, and one of the two GOA unit groups is adjacent to an edge of the display area.

In one preferable embodiment of the present disclosure, another one of the two GOA unit groups is disposed between adjacent rows of the pixel units.

In comparison to prior art, the present disclosure achieves a super narrow bezel design by arranging the cascaded GOA unit group of the GOA circuit within the display area of the GOA display panel. Furthermore, by setting the trace group of the GOA circuit in the bezel area to be separated from data lines of pixel units, the data lines do not overlap with the GOA bus in a longitudinal direction. Thus, it is possible to avoid problems that the pixel units are insufficiently charged or an image is displayed uneven due to a large RC loading is generated when signals are transmitted on the data lines and the GOA bus.

DETAILED DESCRIPTION

The structure and the technical means adopted by the present disclosure to achieve the above and other objects can be best understood by referring to the following detailed description of the preferred embodiments and the accompanying drawings.

Figure 3:
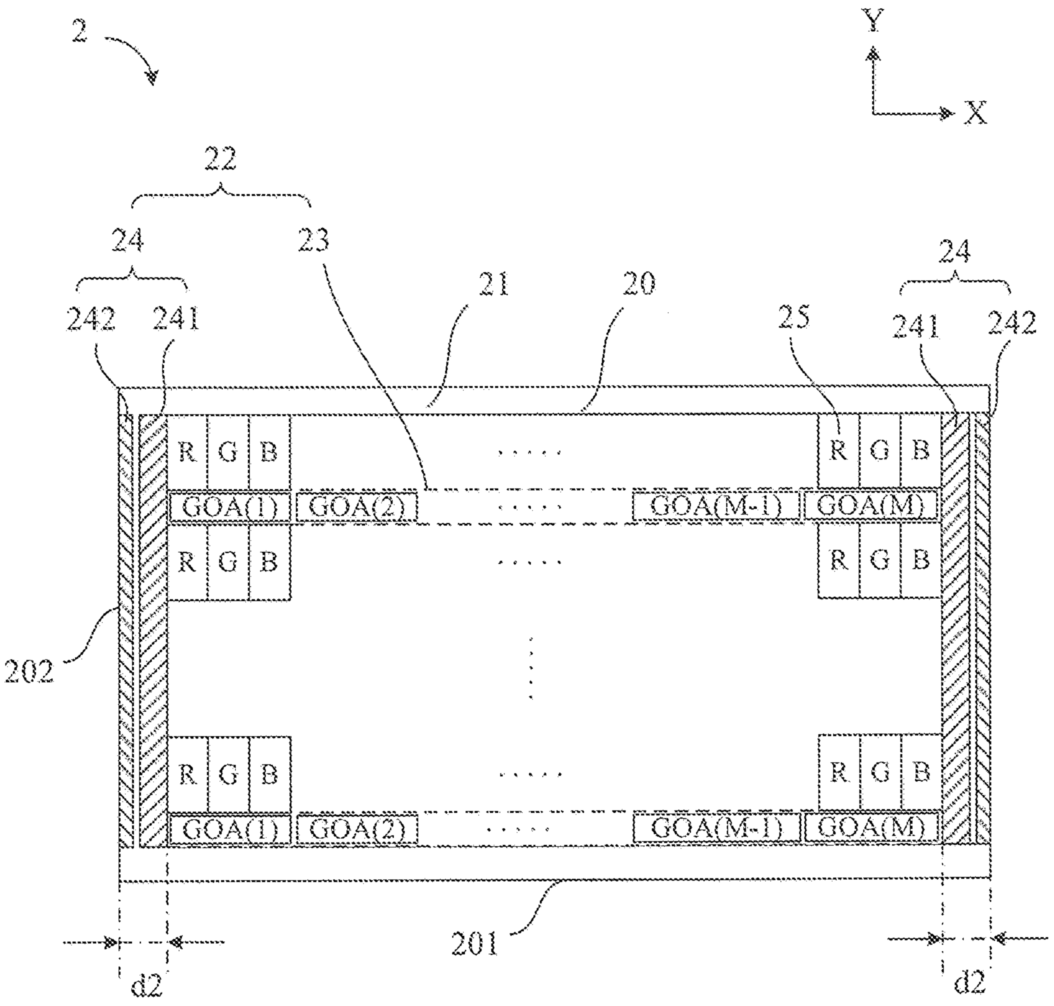
FIG. 3 is a schematic diagram of a GOA display panel of a preferred embodiment of the present disclosure.

Please refer to FIG. 3, which is a schematic diagram of a GOA display panel 2 of a preferred embodiment of the present disclosure. The GOA display panel 2 is a display panel in which a gate driving circuit is formed on an array substrate instead of a driving chip fabricated from an external silicon chip. The display area 20 defines a display area 20 and a bezel area 21. The display area 20 is an active area of the display panel for displaying an image, and the bezel area 21 is surrounded by an outer periphery of the display area 20 and configured to be a layout space of circuits and related traces.

As shown in FIG. 3, the GOA display panel 2 includes a GOA circuit 22 and a plurality of pixel units 25. The plurality of pixel units 25 are arranged in an array and disposed in the display area 20. The GOA circuit 22 includes GOA unit groups 23 and trace groups 24. Each the GOA unit group 23 is disposed in the display area 20, and the trace groups 24 are electrically connected to the GOA unit groups 23 and disposed in the bezel area 21. Each the trace group 24 includes a GOA bus 241 and a common electrode line 242.

As shown in FIG. 3, an outline of the GOA display panel 2 is substantially rectangular, including two opposite long sides 201 and two opposite short sides 202. Each the long side 201 is adjacent to the short sides 202. The GOA unit groups 23 are disposed along an extending direction X of the long sides 201 of the GOA display panel 2, and the trace groups 24 are disposed along an extending direction Y of the short sides 202 of the GOA display panel 2.

As shown in FIG. 3, each GOA unit group 23 includes a plurality of GOA units, such as GOA (1), GOA (2), GOA (M−1), GOA (M), etc., where M is a positive integer greater than one. Each the GOA unit group 23 is connected to the GOA bus 241 via its own signal lead. Driving signals of the display panel 2 are input from respective signal input terminals, and are transmitted to the signal leads of the GOA units of the GOA unit group 23 connected thereto through the GOA bus 241, and then reach a clock signal input terminals of the respective GOA units to realize signal drive for each GOA unit.

Figure 4:
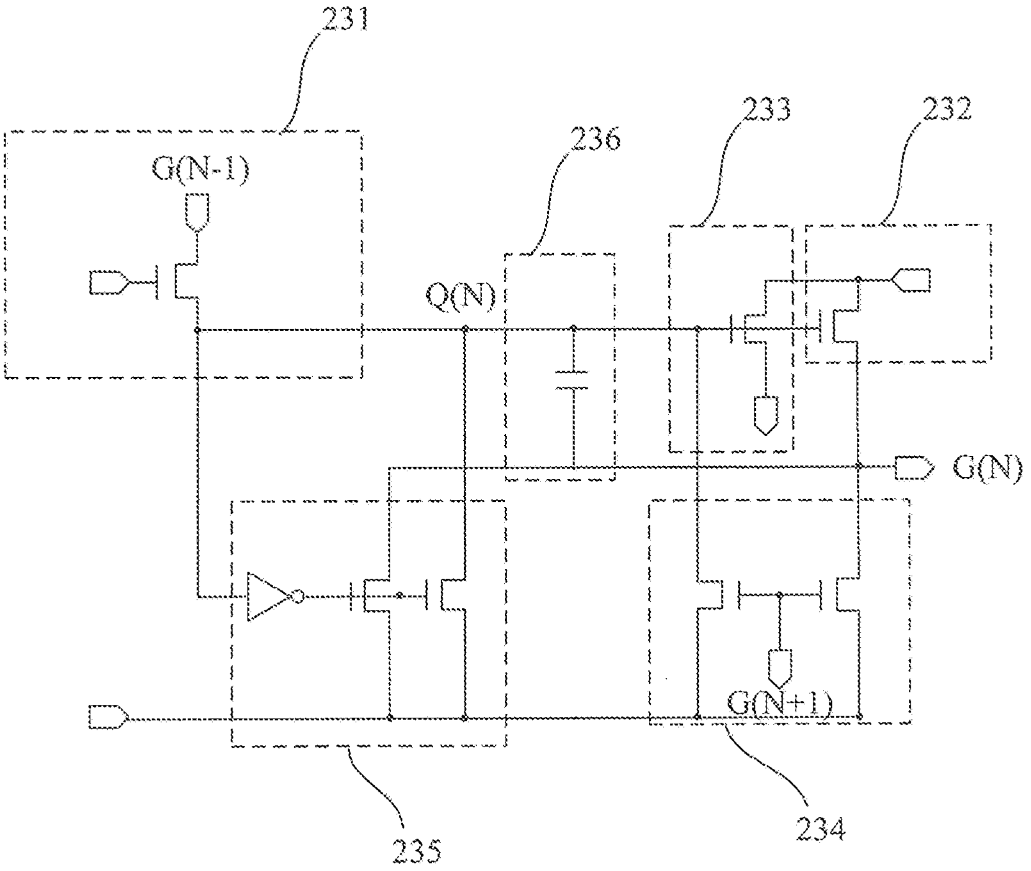
FIG. 4 is a schematic diagram of a GOA unit of a preferred embodiment of the present disclosure.

Please refer to FIG. 4, which is a schematic diagram of the GOA unit of a preferred embodiment of the present disclosure. The GOA units of the GOA unit group 23 are cascaded, and each stage of GOA units corresponds to driving a stage horizontal scanning line. Each the GOA units include a pull-up control circuit 231, a pull-up circuit 232, a down transfer circuit 233, a pull-down circuit 234, a pull-dawn holding circuit 235, and a bootstrap capacitor 236 configured to pull-up a potential. The pull-up control circuit 231 controls an onset time of the pull-up circuit 232 for precharging of a node Q(N), where N is a positive integer greater than one. The pull-up control circuit 231 is connected to a previous stage GOA unit for receiving a transfer signal G(N−1) from the previous stage GOA unit. The pull-up circuit 232 outputs a clock signal as a gate signal G(N). The down transfer circuit 233 controls a signal G(N+1) of a next stage GOA units to be turned-on or turned-off. The pull-down circuit 234 is configured to pull-down the gate signal to a low potential at a first time, that is, turning off the gate signal. The pull-down holding circuit 235 holds the potential of the node Q(N) in a closed state (i.e., a negative potential). The bootstrap capacitor 236 boosts the potential of the node Q(N) again, which facilitates an output of the gate signal G(N) of the pull-up circuit 232.

Figure 1:
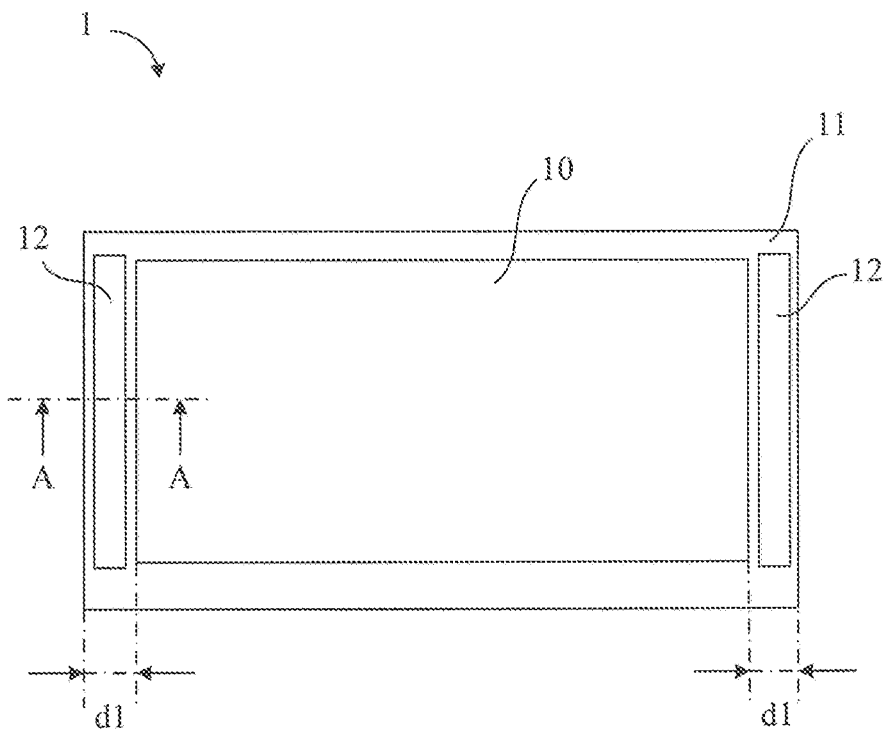
FIG. 1 is a schematic diagram of a GOA display panel in the prior art.
Figure 2:
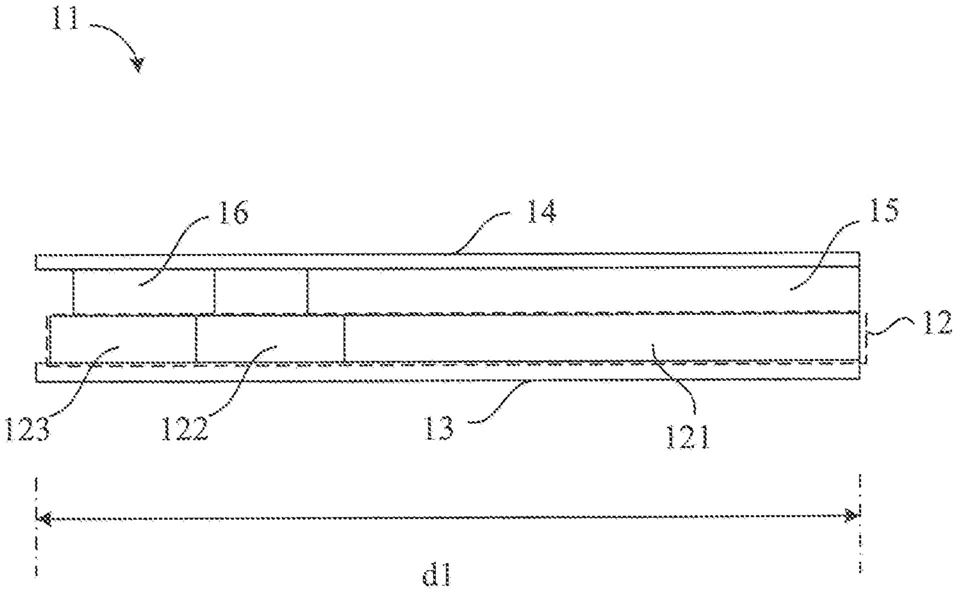
FIG. 2 is a partial cross-sectional view of the GOA display panel of FIG. 1 along an A-A line.

As shown in FIG. 3, a width of one of the trace groups 24 of the GOA circuit 22 is equal to a distance of one of the trace groups 24 from one side in contact with the display area 20 to an edge of the adjacent short side 202 of the GOA display panel 2. Preferably, each the trace group 24 has a width of less than or equal to 1.2 microns. In a preferred embodiment, in a case of using the same resolution as the prior art display panel, the present disclosure can produce a total width along the extending direction X of the long sides 201 that is only equal to a width (i.e., a width of the display area 10 of the display panel 1 as shown in FIG. 1, that is, a width 2*d1 of the bezel area 11 is not included) of a display area in the prior art. For example, in a 4K resolution display design, there are 3840*3 pixel units 25 in the extending direction X of the long sides 201. In comparison to a pixel size of display panels in the prior art, the present disclosure reduces the pixel size by about 10%, for example, reducing 0.22 um, and an overall layout does not significantly affect a visual experience. With this design, a total width of 3840*3*0.22 um=2304 um can be obtained. The obtained width is evenly distributed to the bezel area 21 on both sides of the GOA display panel 2 such that the width d2 of the bezel area 21 is only 1.152 μm. The width d2 of this bezel area 21 is sufficient to set the GOA bus 241 and the common electrode line 242 of the GOA circuit 22.

As shown in FIG. 3, it should be noted that in this embodiment, the GOA display panel 2 adopts a bilateral driving architecture, that is, the GOA display panel 2 includes two GOA unit groups 23 and two trace groups 24, but may be different in other embodiments. The number of GOA unit groups 23 and trace groups 24 are not limited to this. Preferably, the two trace groups 24 are respectively disposed on opposite sides of the display area 20, and the two trace groups 24 are respectively adjacent to edges of the two short sides 202 of the GOA display panel 2. Furthermore, one of the two GOA unit groups 23 is adjacent to an edge of the display area 20, and another GOA unit group 23 is disposed between adjacent rows of the pixel units 25.

In summary, the present disclosure achieves a super narrow bezel design by arranging the cascaded GOA unit group of the GOA circuit within the display area of the GOA display panel. Furthermore, by setting, the trace group of the GOA circuit in the bezel area to be separated from data lines of pixel units, the data lines do not overlap with the GOA bus in a longitudinal direction (Y direction). Thus, it is possible to avoid problems that the pixel units are insufficiently charged or an image is displayed uneven due to a large RC loading is generated when signals are transmitted on the data lines and the GOA bus. Moreover, due to a consistency a layout design of the GOA bus, a uniformity of the RC load generated by the GOA bus can be ensured. In addition, the GOA display panel of the present disclosure does not require an existing manufacturing process or an additional metal layer, thereby reducing production costs.

The above descriptions are merely preferable embodiments of the present disclosure, and are not intended to limit the scope of the present disclosure. Any modification or replacement made by those skilled in the art without departing from the spirit and principle of the present disclosure should fall within the protection scope of the present disclosure.

What is claimed is:

1. A gate driver on array (GOA) display panel, comprising:

a display area;

a bezel area;

a plurality of pixel units disposed in the display area in an array; and a GOA circuit, comprising:

a GOA unit group comprising a plurality of cascaded GOA units and disposed in the display area, wherein the GOA unit group is disposed along an extending direction of a long side of the GOA display panel; and a trace group electrically connected to the GOA unit group and disposed in the bezel area, wherein the trace group comprises a GOA bus and a common electrode line, the trace group is disposed along an extending direction of a short side of the GOA display panel, and the long side is adjacent to the short side, wherein a width of the trace group is equal to a distance from a side of the trace group that is in contact with the display area to an edge of the short side of the GOA display panel.

2. The GOA display panel as claimed in claim 1, wherein each of the GOA units comprises a pull-up control circuit, a pull-up circuit, a down transfer circuit, a pull-down circuit, a pull-down holding circuit, and a bootstrap capacitor.

3. The GOA display panel as claimed in claim 1, wherein the width of the trace group is less than or equal to 1.2 micrometers.

4. The GOA display panel as claimed in claim 1, wherein the GOA display panel comprises two trace groups respectively disposed on opposite sides of the display area, and the two trace groups are respectively adjacent to edges of two short sides of the GOA display panel.

5. The GOA display panel as claimed in claim 1, wherein the GOA display panel comprises two GOA unit groups, and one of the two GOA unit groups is adjacent to an edge of the display area.

6. The GOA display panel as claimed in claim 5, wherein another one of the two GOA unit groups is disposed between adjacent rows of the pixel units.

7. A gate driver on array (GOA) display panel, comprising:

a display area;

a bezel area;

a plurality of pixel units disposed in the display area in an array; and a GOA circuit, comprising:

a GOA unit group disposed in the display area; and a trace group electrically connected to the GOA unit group and disposed in the bezel area, wherein the trace group comprises a GOA bus and a common electrode line, wherein a width of the trace group is equal to a distance from a side of the trace group that is in contact with the display area to an edge of the short side of the GOA display panel.

8. The GOA display panel as claimed in claim 7, wherein the GOA unit group is disposed along an extending direction of a long side of the GOA display panel.

9. The GOA display panel as claimed in claim 8, wherein the trace group is disposed along an extending direction of a short side of the GOA display panel, and the long side is adjacent to the short side.

10. The GOA display panel as claimed in claim 7, wherein the GOA unit group comprises a plurality of cascaded GOA units.

11. The GOA display panel as claimed in claim 10, wherein each of the GOA units comprises a pull-up control circuit, a pull-up circuit, a down transfer circuit, a pull-down circuit, a pull-down holding circuit, and a bootstrap capacitor.

12. The GOA display panel as claimed in claim 7, wherein the width of the trace group is less than or equal to 1.2 micrometers.

13. The GOA display panel as claimed in claim 7, wherein the GOA display panel comprises two trace groups respectively disposed on opposite sides of the display area, and the two trace groups are respectively adjacent to edges of two short sides of the GOA display panel.

14. The GOA display panel as claimed in claim 7, wherein the GOA display panel comprises two GOA unit groups, and one of the two GOA unit groups is adjacent to an edge of the display area.

15. The GOA display panel as claimed in claim 14, wherein another one of the two GOA unit groups is disposed between adjacent rows of the pixel units.

* * * * *